United States Patent
Sun et al.

(10) Patent No.: US 10,581,574 B2
(45) Date of Patent: Mar. 3, 2020

(54) DATA TRANSMISSION METHOD, AND APPARATUS

(71) Applicant: HUAWEI TECHNOLOGIES CO., LTD., Shenzhen, Guangdong (CN)

(72) Inventors: Hao Sun, Beijing (CN); Xu Zhang, Beijing (CN); Lixia Xue, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/988,105

(22) Filed: May 24, 2018

(65) Prior Publication Data

US 2018/0270034 A1    Sep. 20, 2018

Related U.S. Application Data

(63) Continuation of application No. PCT/CN2016/101810, filed on Oct. 11, 2016.

(30) Foreign Application Priority Data

Nov. 27, 2015    (CN) .......................... 2015 1 0851414

(51) Int. Cl.
*H04L 5/00* (2006.01)
*H04W 28/02* (2009.01)
(Continued)

(52) U.S. Cl.
CPC .......... *H04L 5/0048* (2013.01); *H04L 5/0053* (2013.01); *H04W 28/0278* (2013.01);
(Continued)

(58) Field of Classification Search
CPC .... H04L 5/0048; H04L 5/0053; H04W 72/12; H04W 72/042; H04W 28/0278; H04W 52/54
See application file for complete search history.

(56) References Cited

U.S. PATENT DOCUMENTS 10,187,758 B2 * 1/2019 Ho .......................... H04W 4/08
2008/0062936 A1 3/2008 He et al.
(Continued)

FOREIGN PATENT DOCUMENTS

CN    102711263 A    10/2012
CN    102869096 A    1/2013
(Continued)

OTHER PUBLICATIONS

Extended European Search Report issued in European Application No. 16867825.8 dated Oct. 16, 2018, 9 pages.
(Continued)

*Primary Examiner* — Brian D Nguyen
(74) *Attorney, Agent, or Firm* — Fish & Richardson P.C.

(57) ABSTRACT

A data transmission method and an apparatus are provided. In this solution, one contention resource group may be divided into a plurality of terminal device groups, and terminal devices with a same DMRS may exist in two different terminal device groups. Even when terminal devices with a same DMRS exist in two different terminal device groups, interference can still be avoided. Therefore, according to embodiments of the present invention, a quantity of connected terminal devices in one contention resource group is increased while good communication quality is obtained.

17 Claims, 3 Drawing Sheets

A base station sends first control signaling, where the first control signaling is used to schedule a first terminal device group in a contention resource group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by a terminal device — 100

The base station receives, according to the first control signaling, data transmitted by the first terminal device group on all or some second time domain resources of the first time domain resource — 110

(51) Int. Cl.
*H04W 72/04* (2009.01)
*H04W 72/12* (2009.01)
*H04W 52/54* (2009.01)

(52) U.S. Cl.
CPC ......... *H04W 72/042* (2013.01); *H04W 72/12* (2013.01); *H04W 52/54* (2013.01)

(56) References Cited

U.S. PATENT DOCUMENTS

| | | |
|---|---|---|
| 2011/0243080 A1 | 10/2011 | Chen et al. |
| 2014/0036810 A1 | 2/2014 | Harrison et al. |
| 2014/0247799 A1 | 9/2014 | Suzuki et al. |
| 2015/0009911 A1 | 1/2015 | Li et al. |
| 2016/0087774 A1 | 3/2016 | Guo et al. |
| 2016/0183076 A1* | 6/2016 | Bagayoko ......... H04W 72/1289 370/329 |
| 2016/0302227 A9* | 10/2016 | Wager ................. H04W 74/006 |
| 2017/0265225 A1* | 9/2017 | Takeda ................. H04W 16/14 |
| 2018/0049185 A1* | 2/2018 | Lee ....................... H04L 5/0044 |
| 2018/0091269 A1* | 3/2018 | Ratilainen ................ H04B 7/02 |
| 2018/0213521 A1* | 7/2018 | Martin ................ H04W 72/048 |

FOREIGN PATENT DOCUMENTS

| | | |
|---|---|---|
| CN | 103858503 A | 6/2014 |
| CN | 104125186 A | 10/2014 |
| CN | 104168656 A | 11/2014 |
| CN | 104284423 A | 1/2015 |
| CN | 104468019 A | 3/2015 |
| JP | 2013522940 A | 6/2013 |
| WO | 2008153365 A2 | 12/2008 |
| WO | 2013189410 A2 | 12/2013 |

OTHER PUBLICATIONS

Office Action issued in Chinese Application No. 201510851414.X dated Apr. 17, 2019, 11 pages (with English translation).
International Search Report issued in International Application No. PCT/CN2016/101810 dated Dec. 29, 2016, 9 pages.
Huawei, HiSilicon, Contention based uplink transmission [online], 3GPP TSG-RAN WG2#91bis R2-154191, Sep. 26, 2015, 5 pages.
MediaTek Inc., UL Contention Based Access for Latency Reduction [online], 3GPP TSG-RA WG2#90 R2-152383, May 15, 2015, 8 pages.
Office Action issued in Japanese application No. 2018/527,101, dated Jun. 28, 2019, 20 pages (With English translation).

* cited by examiner

A base station sends first control signaling, where the first control signaling is used to schedule a first terminal device group in a contention resource group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by a terminal device — 100

The base station receives, according to the first control signaling, data transmitted by the first terminal device group on all or some second time domain resources of the first time domain resource — 110

FIG. 1A

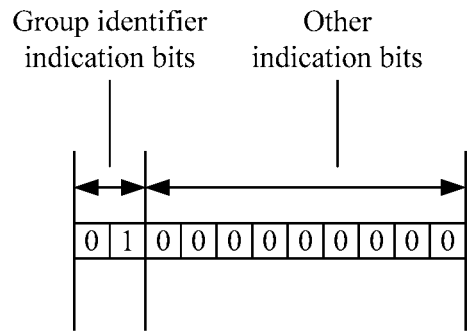

FIG. 1B

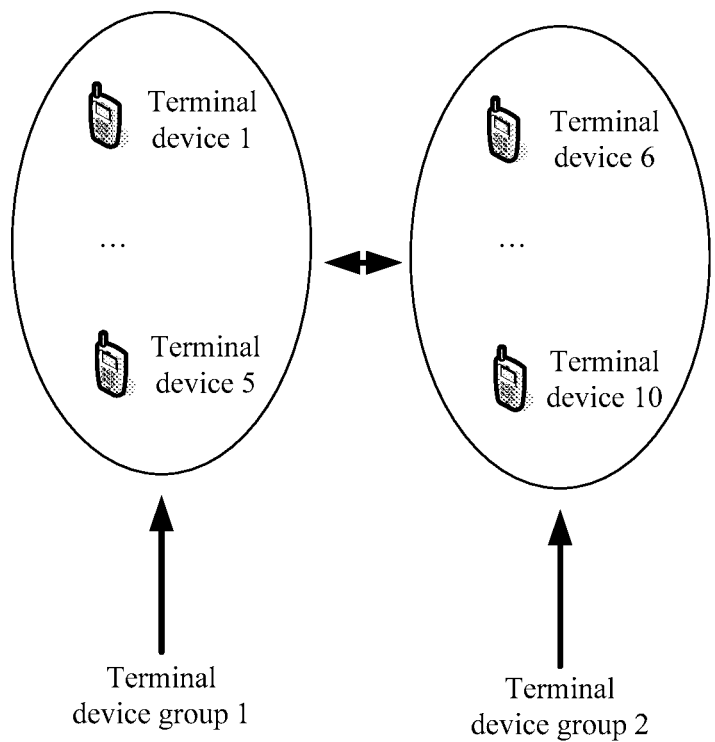

FIG. 1C

| A terminal device in a first terminal device group in a contention resource group receives first control signaling sent by a base station, where the first control signaling is used to schedule the first terminal device group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by the terminal device | 200 |

| The terminal device transmits data on all or some second time domain resources of the first time domain resource according to the first control signaling | 210 |

FIG. 2

DATA TRANSMISSION METHOD, AND APPARATUS

CROSS-REFERENCE TO RELATED APPLICATION

This application is a continuation of International Application No. PCT/CN2016/101810, filed on Oct. 11, 2016, which claims priority to Chinese Patent Application No. 201510851414.X, filed on Nov. 27, 2015. The disclosures of the aforementioned applications are hereby incorporated by reference in their entireties.

TECHNICAL FIELD

The present invention relates to the field of communications technologies, and in particular, to a data transmission method and an apparatus.

BACKGROUND

In a current LTE (Long Term Evolution) system, uplink and downlink data are scheduled in a one-to-one manner by using a PDCCH (physical downlink control channel) or an E-PDCCH (enhanced-PDCCH). With the development of communications technologies, a capacity of the control channel is challenged by an ultra large quantity of user connections and a potential quantity of concurrently connected users in future communication. Optimization of control channel overheads is becoming an important direction of a future evolved LTE system.

To reduce overheads of a control channel, a group scheduling-based uplink contention transmission solution is developed. A main idea of this solution is: A base station classifies terminal devices into a plurality of contention resource groups; uplink transmission for each contention resource group is initiated by a CB-grant (contention-based grant) sent by the base station; and the base station distinguishes CB-grants of different contention resource groups by scrambling using different CB-RNTIs (contention-based radio network temporary identifier). When a terminal device detects a CB-grant that matches a contention resource group to which the terminal device belongs, the terminal device transmits data on a resource scheduled by the CB-grant.

In this solution, the base station uses one piece of control signaling to schedule a plurality of terminal devices in one contention transmission resource group, and uses DMRS (demodulation reference signal) sequences of terminal devices to distinguish uplink data transmitted by the terminal devices. According to this solution, uplink transmission of a plurality of terminals is made possible by one scheduling. Therefore, scheduling overheads can be reduced.

Although overheads of a control channel can be reduced according to the group scheduling-based uplink contention transmission solution, to ensure orthogonality between DMRSs of different terminal devices, a maximum quantity of terminal devices in one contention transmission resource group is 8. This greatly restricts a quantity of connected terminal devices in an entire system and cannot meet a requirement of a future big connection system for a quantity of connected terminal devices. If a quantity of terminal devices included in a terminal device group exceeds 8, communication quality of the terminal devices is relatively poor.

Therefore, the foregoing data transmission solution has a problem that balance cannot be achieved between a quantity of connected terminal devices and communication quality of the terminal devices.

SUMMARY

Embodiments of the present invention provide a data transmission method and an apparatus, so as to resolve a prior-art problem that balance cannot be achieved between a quantity of connected terminal devices and communication quality of the terminal devices.

According to a first aspect, a data transmission method is provided, including:

sending, by a base station, first control signaling, where the first control signaling is used to schedule a first terminal device group in a contention resource group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by a terminal device; and receiving, by the base station according to the first control signaling, data transmitted by the first terminal device group on all or some second time domain resources of the first time domain resource.

With reference to the first aspect, in a first possible implementation, the first control signaling carries a first group identifier of the first terminal device group; and before the sending, by the base station, first control signaling, the method further includes:

sending, by the base station, first configuration information to each terminal device in the first terminal device group, where the first configuration information includes the first group identifier.

With reference to the first possible implementation of the first aspect, in a second possible implementation, the first configuration information further includes first period information and first indication information that is used to indicate a third time domain resource, the first period information is a first period length of a time domain resource that allows scheduling as indicated by the first control signaling, the third time domain resource is a first period quantity of the time domain resource that allows scheduling as indicated by the first control signaling, and the third time domain resource includes the first time domain resource.

With reference to the second possible implementation of the first aspect, in a third possible implementation, after the receiving, by the base station according to the first control signaling, data transmitted by the first terminal device group on all or some second time domain resources of the first time domain resource, the method further includes:

receiving, by the base station on a time domain resource in the third time domain resource except the first time domain resource and according to the first period information, the data transmitted by the first terminal device group.

With reference to the second or the third possible implementation of the first aspect, in a fourth possible implementation, the first configuration information uses at least one of a new data indication NDI field, a transmission power control TPC command command field, a cyclic shift CS for demodulation reference signal DMRS and orthogonal cover code OCC field, or a modulation and coding scheme MCS & redundancy version RV field of a physical downlink control channel PDCCH format 0 format to indicate the first group identifier and/or the first indication information.

With reference to the fourth possible implementation of the first aspect, in a fifth possible implementation, the first configuration information further includes at least one of a carrier indication, a format 0/1a indication, a frequency hopping indication, a resource indication and frequency hopping resource allocation, an uplink index, or a CSI request of the PDCCH format 0 format.

With reference to the first aspect or the first possible implementation of the first aspect, in a sixth possible implementation, the method further includes:

sending, by the base station, second control signaling, where the second control signaling is used to schedule a second terminal device group in the contention resource group to transmit data on a fourth time domain resource, the first time domain resource is different from the fourth time domain resource, and the fourth time domain resource includes at least one second time domain resource; and receiving, by the base station according to the second control signaling, data transmitted by the second terminal device group on all or some second time domain resources of the fourth time domain resource.

With reference to the sixth possible implementation of the first aspect, in a seventh possible implementation, the second control signaling carries a second group identifier of the second terminal device group; and before the sending, by the base station, second control signaling, the method further includes:

sending, by the base station, second configuration information to each terminal device in the second terminal device group, where the second configuration information includes the second group identifier.

With reference to the seventh possible implementation of the first aspect, in an eighth possible implementation, the second configuration information further includes second period information and second indication information that is used to indicate a fifth time domain resource, the second period information is a second period length of a time domain resource that allows scheduling as indicated by the second control signaling, the fifth time domain resource is a second period quantity of the time domain resource that allows scheduling as indicated by the second control signaling, and the fifth time domain resource includes the fourth time domain resource.

With reference to the eighth possible implementation of the first aspect, in a ninth possible implementation, after the receiving, by the base station according to the second control signaling, data transmitted by the second terminal device group on all or some second time domain resources of the fourth time domain resource, the method further includes:

receiving, by the base station on a time domain resource in the fifth time domain resource except the fourth time domain resource and according to the second period information, the data transmitted by the second terminal device group.

With reference to the eighth or the ninth possible implementation of the first aspect, in a tenth possible implementation, the second configuration information uses at least one of an NDI field, a TPC command field, a CS for DMRS and OCC field, or an MCS & RV field of a PDCCH format 0 format to indicate the second group identifier and/or the second indication information.

With reference to the tenth possible implementation of the first aspect, in an eleventh possible implementation, the second configuration information further includes at least one of a carrier indication, a format 0/1a indication, a frequency hopping indication, a resource indication and frequency hopping resource allocation, an uplink index, or a CSI request of the PDCCH format 0 format.

With reference to any one of the sixth to the eleventh possible implementations of the first aspect, in a twelfth possible implementation, when the first control signaling and the second control signaling are sent on a same time domain resource, the third time domain resource is the same as the fifth time domain resource; the third time domain resource is a time domain resource that the first terminal device group is allowed to use; and the third time domain resource includes the first time domain resource.

With reference to any one of the first aspect, or the first to the twelfth possible implementations of the first aspect, in a thirteenth possible implementation, the method further includes:

sending, by the base station, third control signaling to all terminal devices in the contention resource group, where the third control signaling is used to instruct all the terminal devices to send sounding reference signals SRSs; and receiving, by the base station, an SRS sent by each of all the terminal devices, calculating channel state information CSIs of corresponding terminal devices according to the received SRSs, and re-grouping the terminal devices in the contention resource group according to the CSIs corresponding to all the terminal devices respectively.

With reference to any one of the first aspect, or the first to the thirteenth possible implementations of the first aspect, in a fourteenth possible implementation, the method further includes:

sending, by the base station, fourth control signaling to all the terminal devices in the contention resource group, where the fourth control signaling is used to instruct all the terminal devices to send buffer status reports BSRs; and receiving, by the base station, the BSRs sent by all the terminal devices, and re-grouping the terminal devices in the contention resource group according to the BSRs sent by all the terminal devices respectively.

With reference to any one of the first aspect, or the first to the fourteenth possible implementations of the first aspect, in a fifteenth possible implementation, the method further includes:

re-grouping, by the base station, the terminal devices in the contention resource group according to historical load statistics.

With reference to any one of the first aspect, or the first to the fifteenth possible implementations of the first aspect, in a sixteenth possible implementation, both the first control signaling and the second control signaling are scrambled by using a contention-based radio network temporary identifier CB-RNTI corresponding to the contention resource group.

According to a second aspect, a data transmission method is provided, including:

receiving, by a terminal device in a first terminal device group in a contention resource group, first control signaling sent by a base station, where the first control signaling is used to schedule the first terminal device group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by the terminal device; and transmitting, by the terminal device, data on all or some second time domain resources of the first time domain resource according to the first control signaling.

With reference to the second aspect, in a first possible implementation, the first control signaling carries a first group identifier of the first terminal device group; and before the receiving, by a terminal device in a first terminal device group in a contention resource group, first control signaling sent by a base station, the method further includes:

receiving, by the terminal device, first configuration information sent by the base station, and determining, according to the first configuration information, that a group identifier of the first terminal device group is the first group identifier, where the first configuration information includes the first group identifier.

With reference to the first possible implementation of the second aspect, in a second possible implementation, before the transmitting, by the terminal device, data on all or some second time domain resources of the first time domain resource, the method further includes:

determining, by the terminal device, that the first group identifier is a group identifier of the terminal device group to which the terminal device belongs.

With reference to the first or the second possible implementation of the second aspect, in a third possible implementation, the first configuration information further includes first period information and first indication information that is used to indicate a third time domain resource, the first period information is a first period length of a time domain resource that allows scheduling as indicated by the first control signaling, the third time domain resource is a first period quantity of the time domain resource that allows scheduling as indicated by the first control signaling, and the third time domain resource includes the first time domain resource.

With reference to the third possible implementation of the second aspect, in a fourth possible implementation, after the transmitting, by the terminal device, data on all or some second time domain resources of the first time domain resource according to the first control signaling, the method further includes:

sending, by the terminal device according to the first period information, data on a time domain resource in the third time domain resource except the first time domain resource.

With reference to the third or the fourth possible implementation of the second aspect, in a fifth possible implementation, the first configuration information uses at least one of a new data indication NDI field, a transmission power control TPC command command field, a cyclic shift CS for demodulation reference signal DMRS and orthogonal cover code OCC field, or a modulation and coding scheme MCS & redundancy version RV field of a physical downlink control channel PDCCH format 0 format to indicate the first group identifier and/or the first indication information.

With reference to the fifth possible implementation of the second aspect, in a sixth possible implementation, the first configuration information further includes at least one of a carrier indication, a format 0/1a indication, a frequency hopping indication, a resource indication and frequency hopping resource allocation, an uplink index, or a CSI request of the PDCCH format 0 format.

With reference to any one of the second aspect, or the first to the sixth possible implementations of the second aspect, in a seventh possible implementation, the method further includes:

receiving, by the terminal device, third control signaling sent by the base station, and sending a sounding reference signal SRS to the base station according to the third control signaling.

With reference to any one of the second aspect, or the first to the seventh possible implementations of the second aspect, in an eighth possible implementation, the method further includes:

receiving, by the terminal device, fourth control signaling sent by the base station, and sending a buffer status report BSR to the base station according to the fourth control signaling.

With reference to any one of the second aspect, or the first to the eighth possible implementations of the second aspect, in a ninth possible implementation, the first control signaling is scrambled by using a contention-based radio network temporary identifier CB-RNTI corresponding to the contention resource group; and after the receiving, by a terminal device in a first terminal device group, first control signaling sent by a base station and before the transmitting data according to the first control signaling, the method further includes:

decoding, by the terminal device, the first control signaling by using the stored CB-RNTI, and succeeding in the decoding.

According to a third aspect, a base station is provided, including:

a sending unit, configured to send first control signaling, where the first control signaling is used to schedule a first terminal device group in a contention resource group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by a terminal device; and a receiving unit, configured to receive, according to the first control signaling, data transmitted by the first terminal device group on all or some second time domain resources of the first time domain resource.

With reference to the third aspect, in a first possible implementation, the first control signaling carries a first group identifier of the first terminal device group; and the sending unit is further configured to send first configuration information to each terminal device in the first terminal device group, where the first configuration information includes the first group identifier.

With reference to the first possible implementation of the third aspect, in a second possible implementation, the first configuration information further includes first period information and first indication information that is used to indicate a third time domain resource, the first period information is a first period length of a time domain resource that allows scheduling as indicated by the first control signaling, the third time domain resource is a first period quantity of the time domain resource that allows scheduling as indicated by the first control signaling, and the third time domain resource includes the first time domain resource.

With reference to the second possible implementation of the third aspect, in a third possible implementation, the receiving unit is further configured to receive, on a time domain resource in the third time domain resource except the first time domain resource and according to the first period information, the data transmitted by the first terminal device group.

With reference to the second or the third possible implementation of the third aspect, in a fourth possible implementation, the first configuration information uses at least one of a new data indication NDI field, a transmission power control TPC command command field, a cyclic shift CS for demodulation reference signal DMRS and orthogonal cover code OCC field, or a modulation and coding scheme MCS & redundancy version RV field of a physical downlink control channel PDCCH format 0 format to indicate the first group identifier and/or the first indication information.

With reference to the fourth possible implementation of the third aspect, in a fifth possible implementation, the first configuration information further includes at least one of a carrier indication, a format 0/1a indication, a frequency hopping indication, a resource indication and frequency hopping resource allocation, an uplink index, or a CSI request of the PDCCH format 0 format.

With reference to the third aspect or the first possible implementation of the third aspect, in a sixth possible implementation, the sending unit is further configured to send second control signaling, where the second control signaling is used to schedule a second terminal device group in the contention resource group to transmit data on a fourth time domain resource, the first time domain resource is different from the fourth time domain resource, and the fourth time domain resource includes at least one second time domain resource; and the receiving unit is further configured to receive, according to the second control signaling, data transmitted by the second terminal device group on all or some second time domain resources of the fourth time domain resource.

With reference to the sixth possible implementation of the third aspect, in a seventh possible implementation, the second control signaling carries a second group identifier of the second terminal device group; and the sending unit is further configured to send second configuration information to each terminal device in the second terminal device group, where the second configuration information includes the second group identifier.

With reference to the seventh possible implementation of the third aspect, in an eighth possible implementation, the second configuration information further includes second period information and second indication information that is used to indicate a fifth time domain resource, the second period information is a second period length of a time domain resource that allows scheduling as indicated by the second control signaling, the fifth time domain resource is a second period quantity of the time domain resource that allows scheduling as indicated by the second control signaling, and the fifth time domain resource includes the fourth time domain resource.

With reference to the eighth possible implementation of the third aspect, in a ninth possible implementation, the receiving unit is further configured to receive, on a time domain resource in the fifth time domain resource except the fourth time domain resource and according to the second period information, the data transmitted by the second terminal device group.

With reference to the eighth or the ninth possible implementation of the third aspect, in a tenth possible implementation, the second configuration information uses at least one of an NDI field, a TPC command field, a CS for DMRS and OCC field, or an MCS & RV field of a PDCCH format 0 format to indicate the second group identifier and/or the second indication information.

With reference to the tenth possible implementation of the third aspect, in an eleventh possible implementation, the second configuration information further includes at least one of a carrier indication, a format 0/1a indication, a frequency hopping indication, a resource indication and frequency hopping resource allocation, an uplink index, or a CSI request of the PDCCH format 0 format.

With reference to any one of the sixth to the eleventh possible implementations of the third aspect, in a twelfth possible implementation, when the first control signaling and the second control signaling are sent on a same time domain resource, the third time domain resource is the same as the fifth time domain resource; the third time domain resource is a time domain resource that the first terminal device group is allowed to use; and the third time domain resource includes the first time domain resource.

With reference to any one of the third aspect, or the first to the twelfth possible implementations of the third aspect, in a thirteenth possible implementation, the sending unit is further configured to send third control signaling to all terminal devices in the contention resource group, where the third control signaling is used to instruct all the terminal devices to send sounding reference signals SRSs;

the receiving unit is further configured to receive an SRS sent by each of all the terminal devices; and the base station further includes a processing unit, configured to: calculate channel state information CSIs of corresponding terminal devices according to the received SRSs, and re-group the terminal devices in the contention resource group according to the CSIs corresponding to all the terminal devices respectively.

With reference to any one of the third aspect, or the first to the thirteenth possible implementations of the third aspect, in a fourteenth possible implementation, the sending unit is further configured to send fourth control signaling to all the terminal devices in the contention resource group, where the fourth control signaling is used to instruct all the terminal devices to send buffer status reports BSRs;

the receiving unit is further configured to receive the BSRs sent by all the terminal devices; and the base station further includes the processing unit, configured to re-group the terminal devices in the contention resource group according to the BSRs sent by all the terminal devices respectively.

With reference to any one of the third aspect, or the first to the fourteenth possible implementations of the third aspect, in a fifteenth possible implementation, the base station further includes the processing unit, configured to re-group the terminal devices in the contention resource group according to historical load statistics.

With reference to any one of the third aspect, or the first to the fifteenth possible implementations of the third aspect, in a sixteenth possible implementation, both the first control signaling and the second control signaling are scrambled by using a contention-based radio network temporary identifier CB-RNTI corresponding to the contention resource group.

According to a fourth aspect, a terminal device is provided, including:

a receiving unit, configured to receive first control signaling sent by a base station, where the first control signaling is used to schedule the first terminal device group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by the terminal device; and a sending unit, configured to transmit data on all or some second time domain resources of the first time domain resource according to the first control signaling.

With reference to the fourth aspect, in a first possible implementation, the first control signaling carries a first group identifier of the first terminal device group;

the receiving unit is further configured to receive first configuration information sent by the base station; and the terminal device further includes a processing unit, configured to determine, according to the first configuration information, that a group identifier of the first terminal device group is the first group identifier, where the first configuration information includes the first group identifier.

With reference to the first possible implementation of the fourth aspect, in a second possible implementation, the terminal device further includes the processing unit, configured to determine that the first group identifier is a group identifier of a terminal device group to which the terminal device belongs.

With reference to the first or the second possible implementation of the fourth aspect, in a third possible implementation, the first configuration information further includes first period information and first indication information that is used to indicate a third time domain resource, the first period information is a first period length of a time domain resource that allows scheduling as indicated by the first control signaling, the third time domain resource is a first period quantity of the time domain resource that allows scheduling as indicated by the first control signaling, and the third time domain resource includes the first time domain resource.

With reference to the third possible implementation of the fourth aspect, in a fourth possible implementation, the sending unit is further configured to send data on a time domain resource in the third time domain resource except the first time domain resource and according to the first period information.

With reference to the third or the fourth possible implementation of the fourth aspect, in a fifth possible implementation, the first configuration information uses at least one of a new data indication NDI field, a transmission power control TPC command command field, a cyclic shift CS for demodulation reference signal DMRS and orthogonal cover code OCC field, or a modulation and coding scheme MCS & redundancy version RV field of a physical downlink control channel PDCCH format 0 format to indicate the first group identifier and/or the first indication information.

With reference to the fifth possible implementation of the fourth aspect, in a sixth possible implementation, the first configuration information further includes at least one of a carrier indication, a format 0/1a indication, a frequency hopping indication, a resource indication and frequency hopping resource allocation, an uplink index, or a CSI request of the PDCCH format 0 format.

With reference to any one of the fourth aspect, or the first to the sixth possible implementations of the fourth aspect, in a seventh possible implementation, the receiving unit is further configured to receive third control signaling sent by the base station; and the sending unit is further configured to send a sounding reference signal SRS to the base station according to the third control signaling.

With reference to any one of the fourth aspect, or the first to the seventh possible implementations of the fourth aspect, in an eighth possible implementation, the receiving unit is further configured to receive fourth control signaling sent by the base station; and the sending unit is further configured to send a buffer status report BSR to the base station according to the fourth control signaling.

With reference to any one of the fourth aspect, or the first to the eighth possible implementations of the fourth aspect, in a ninth possible implementation, the first control signaling is scrambled by using a contention-based radio network temporary identifier CB-RNTI corresponding to the contention resource group; and the terminal device further includes the processing unit, configured to: decode the first control signaling by using the stored CB-RNTI, and succeed in the decoding.

In the embodiments of the present invention, a data transmission method is provided. In this solution, one contention resource group may be divided into a plurality of terminal device groups, and terminal devices with a same DMRS may exist in two different terminal device groups. Even when terminal devices with a same DMRS exist in two different terminal device groups, interference can still be avoided. Therefore, according to the embodiments of the present invention, a quantity of connected terminal devices in one contention resource group is increased while good communication quality is obtained.

BRIEF DESCRIPTION OF DRAWINGS

FIG. 1A is a flowchart of data transmission according to an embodiment of the present invention;

FIG. 1B is a schematic diagram of group identifier indication bits according to an embodiment of the present invention;

FIG. 1C is a schematic diagram of a terminal device group according to an embodiment of the present invention;

FIG. 2 is another flowchart of data transmission according to an embodiment of the present invention;

DESCRIPTION OF EMBODIMENTS

Figure 3A:
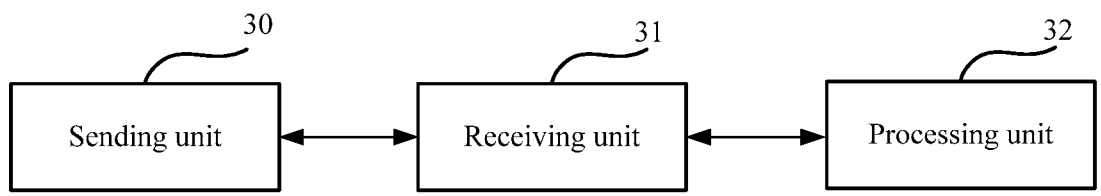
FIG. 3A is a schematic diagram of a base station according to an embodiment of the present invention.

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

The following describes application fields and basic technologies to which the present invention is applicable, to help better understand the present invention.

The technical solutions in the embodiments of the present invention may be applied to various communications systems, such as GSM (Global System for Mobile Communications), a CDMA (Code Division Multiple Access) system, a WCDMA (Wideband Code Division Multiple Access) system, a GPRS (General Packet Radio Service) system, or an LTE (Long Term Evolution) system.

A terminal device may also be referred to as a mobile terminal, a mobile terminal device, or the like and is not specifically limited herein. The terminal device may communicate with one or more core networks by using a radio access network (for example, RAN (radio access network). The terminal device may be a mobile terminal such as a mobile phone (also referred to as a "cellular" phone), or a computer with a mobile terminal. For example, the terminal device may be a portable, pocket-sized, handheld, computer built-in, or in-vehicle mobile apparatus, which exchanges voice and/or data with the radio access network.

A base station may be a base transceiver station (BTS, Base Transceiver Station) in GSM or CDMA, may also be a NodeB in WCDMA, or may be an evolved NodeB (eNB or e-NodeB, evolutional Node B) in LTE. This is not specifically limited in the embodiments of the present invention.

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

"A plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In the following, preferred implementations of the present invention are described in detail with reference to the accompanying drawings. It should be understood that the preferred embodiments described herein are merely used to illustrate and explain the present invention, but are not intended to limit the present invention. In addition, the embodiments of this application and features in the embodiments may be combined when they do not conflict with each other.

The following describes the embodiments of the present invention in detail with reference to the accompanying drawings.

Referring to FIG. 1A, in an embodiment of the present invention, a flowchart of data transmission is as follows:

Step 100: A base station sends first control signaling, where the first control signaling is used to schedule a first terminal device group in a contention resource group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by a terminal device.

Step 110: The base station receives, according to the first control signaling, data transmitted by the first terminal device group on all or some second time domain resources of the first time domain resource.

In this embodiment of the present invention, the first control signaling is used to schedule a terminal device group. Therefore, the first control signaling further carries a first group identifier of the first terminal device group. In this way, a terminal device that receives the control signaling can determine whether the control signaling is used to schedule a terminal device group to which the terminal device belongs.

For example, the contention resource group includes 10 terminal devices: a terminal device 1, a terminal device 2, . . . , and a terminal device 10, and the contention resource group is divided into two terminal device groups: a terminal device group 1 and a terminal device group 2. The terminal device group 1 includes the terminal device 1, the terminal device 2, the terminal device 3, the terminal device 4, and the terminal device 5, and the terminal device group 2 includes the terminal device 6, the terminal device 7, the terminal device 8, the terminal device 9, and the terminal device 10. The first control signaling is used to schedule the terminal device group 1. Therefore, the first control signaling carries a first group identifier of the terminal device group 1. In this way, after receiving the first control signaling, each terminal in the terminal device group 1 can determine, according to the first group identifier in the first control signaling, whether the terminal device group 1 is to be scheduled.

In this embodiment of the present invention, n bits in the control signaling may be used to indicate a group identifier. If n is 1, the contention resource group may include a maximum of two terminal device groups; if n is 2, the contention resource group may include a maximum of four terminal device groups; and the rest may be deduced by analogy. Considering an actual application requirement and utilization efficiency of a terminal device group indication bit field, optionally, a value range of n may be [1,3]. As shown in FIG. 1B, a value of n is 2, and an indicated terminal device group is a group identifier of the terminal device group 2.

In an LTE system, one piece of control signaling can be used to schedule only one uplink transmission of one terminal device group. However, in a big connection scenario, this scheduling manner has a disadvantage of excessively high resource overheads. Therefore, in this embodiment of the present invention, control signaling has a specific effective time. That is, within the effective time, a scheduled terminal device conforms to scheduling of the control signaling. Therefore, in this embodiment of the present invention, to improve resource utilization and reduce signaling overheads, first configuration information further includes first period information and first indication information that is used to indicate a third time domain resource, the first period information is a first period length of a time domain resource that allows scheduling as indicated by the first control signaling, the third time domain resource is a first period quantity of the time domain resource that allows scheduling as indicated by the first control signaling, and the third time domain resource includes the first time domain resource.

In this case, after the receiving, by the base station according to the first control signaling, data transmitted by the first terminal device group on all or some second time domain resources of the first time domain resource, the following operation is further included:

receiving, by the base station on a time domain resource in the third time domain resource except the first time domain resource and according to the first period information, the data transmitted by the first terminal device group.

For example, the contention resource group includes 10 terminal devices: a terminal device 1, a terminal device 2, . . . , and a terminal device 10, and the contention resource group is divided into two terminal device groups: a terminal device group 1 and a terminal device group 2. The terminal device group 1 includes the terminal device 1, the terminal device 2, the terminal device 3, the terminal device 4, and the terminal device 5, and the terminal device group 2 includes the terminal device 6, the terminal device 7, the terminal device 8, the terminal device 9, and the terminal device 10. The first control signaling is used to schedule the terminal device group 1, the first period information includes 10 subframes, the first time domain resource includes a subframe 1, a subframe 2, a subframe 3, a subframe 5, and a subframe 10, and the third time domain resource includes three first periods, that is, 30 subframes. Each terminal device in the terminal device group 1 may transmit data in a subframe 1, a subframe 2, a subframe 3, a subframe 5, and a subframe 10 in the $1^{st}$ first period (that is, the subframe 1 to the subframe 10), then transmit data in a subframe 1, a subframe 2, a subframe 3, a subframe 5, and a subframe 10 of 10 subframes (that is, the subframe 1 to the subframe 10) in the $2^{nd}$ first period, and next, transmit data in a subframe 1, a subframe 2, a subframe 3, a subframe 5, and a subframe 10 of 10 subframes (that is, the subframe 1 to the subframe 10) in the $3^{rd}$ first period. In this way, the base station does not need to send the first control signaling once every 10 subframes, but only needs to send the first control signaling once in three first periods, thereby reducing signaling overheads and improving resource utilization.

It should be noted that the first time domain resource may be continuous or non-continuous. For example, the first time domain resource may include a subframe 1 to a subframe 5, or may include a subframe 1, a subframe 3, a subframe 5, a subframe 7, and a subframe 9.

For example, nine bits of the first control signaling are bits occupied by a time domain resource included in a first period. One bit is used to indicate whether one subframe can be used by the first terminal device group, and the nine bits in the first control signaling may indicate whether nine subframes in each first period can be used by the first terminal device group. That a bit is set indicates that a corresponding subframe can be used by the first terminal device group, and that a bit is reset indicates that a corresponding subframe cannot be used by the first terminal device group, or vice versa.

In the foregoing description of this embodiment, that the time domain resource included in the first period occupies nine bits may indicate whether nine subframes can be used by the first terminal device group. Certainly, in actual application, whether subframes of a quantity less than 9 can be used by the first terminal device group may alternatively be indicated. For example, that the time domain resource included in the first period occupies eight bits, seven bits, or six bits may indicate whether eight subframes, seven subframes, or six subframes can be used by the first terminal device group. Further details are not described herein.

In this embodiment of the present invention, the first configuration information uses at least one of an NDI (new data indicator) field, a TPC (transmission power control) command field, a CS (cyclic shift) for DMRS and OCC (orthogonal cover code) field, or an MCS (modulation and coding scheme) & RV (redundancy version) field of a PDCCH format 0 format to indicate the first group identifier and/or the first indication information.

Further, the first configuration information further includes at least one of a carrier indication field, a format 0/1a indication field, a frequency hopping indication field, a resource indication and frequency hopping resource allocation field, an uplink index, or a CSI request field of the PDCCH format 0 format. These fields can retain their original functions.

In this embodiment of the present invention, in addition to the first terminal device group, the contention resource group may include a second terminal device group. Therefore, the method may further include the following operations:

sending, by the base station, second control signaling, where the second control signaling is used to schedule the second terminal device group in the contention resource group to transmit data on a fourth time domain resource, the first time domain resource is different from the fourth time domain resource, and the fourth time domain resource includes at least one second time domain resource; and receiving, by the base station according to the second control signaling, data transmitted by the second terminal device group on all or some second time domain resources of the first time domain resource.

In this embodiment of the present invention, the second control signaling is used to schedule a terminal device group. Therefore, the second control signaling further carries a second group identifier of the second terminal device group. Only in this way can a terminal device that receives the control signaling determine whether the control signaling is used to schedule a terminal device group to which the terminal device belongs.

In this embodiment of the present invention, optionally, the second control signaling carries the second group identifier of the second terminal device group.

Further, before the sending, by the base station, second control signaling, the following operation is further included:

sending, by the base station, second configuration information to each terminal device in the second terminal device group, where the second configuration information includes the second group identifier.

For example, the contention resource group includes 10 terminal devices: a terminal device 1, a terminal device 2, ..., and a terminal device 10, and the contention resource group is divided into two terminal device groups: a terminal device group 1 and a terminal device group 2. The terminal device group 1 includes the terminal device 1, the terminal device 2, the terminal device 3, the terminal device 4, and the terminal device 5, and the terminal device group 2 includes the terminal device 6, the terminal device 7, the terminal device 8, the terminal device 9, and the terminal device 10. The second control signaling is used to schedule the terminal device group 2. Therefore, the second control signaling carries a second group identifier of the terminal device group 2. In this way, after receiving the second control signaling, each terminal in the terminal device group 2 can determine, according to the second group identifier in the second control signaling, whether the terminal device group 2 is to be scheduled.

In an LTE system, one piece of control signaling can be used to schedule only one uplink transmission of one terminal device group. However, in a big connection scenario, this scheduling manner has a disadvantage of excessively high resource overheads. Therefore, in this embodiment of the present invention, control signaling has a specific effective time. That is, within the effective time, a scheduled terminal device conforms to scheduling of the control signaling. Therefore, in this embodiment of the present invention, to improve resource utilization and reduce signaling overheads, second configuration information further includes second period information and second indication information that is used to indicate a fifth time domain resource, the second period information is a second period length of a time domain resource that allows scheduling as indicated by the second control signaling, the fifth time domain resource is a second period quantity of the time domain resource that allows scheduling as indicated by the second control signaling, and the fifth time domain resource includes the fourth time domain resource.

In this case, after the receiving, by the base station according to the second control signaling, data transmitted by the second terminal device group on all or some second time domain resources of the first time domain resource, the following operation is further included:

receiving, by the base station on a time domain resource in the fifth time domain resource except the fourth time domain resource and according to the second period information, the data transmitted by the second terminal device group.

For example, the contention resource group includes 10 terminal devices: a terminal device 1, a terminal device 2, . . . , and a terminal device 10, and the contention resource group is divided into two terminal device groups: a terminal device group 1 and a terminal device group 2. The terminal device group 1 includes the terminal device 1, the terminal device 2, the terminal device 3, the terminal device 4, and the terminal device 5, and the terminal device group 2 includes the terminal device 6, the terminal device 7, the terminal device 8, the terminal device 9, and the terminal device 10. The second control signaling is used to schedule the terminal device group 2, the second period information includes 10 subframes, the fourth time domain resource includes a subframe 1, a subframe 2, a subframe 3, a subframe 5, a subframe 10, and the fifth time domain resource includes three second periods, that is, 30 subframes. Each terminal device in the terminal device group 2 may transmit data in a subframe 1, a subframe 2, a subframe 3, a subframe 5, and a subframe 10 in the $1^{st}$ second period (that is, the subframe 1 to the subframe 10), then transmit data in a subframe 1, a subframe 2, a subframe 3, a subframe 5, and a subframe 10 of 10 subframes (that is, the subframe 1 to the subframe 10) in the $2^{nd}$ second period, and next, transmit data in a subframe 1, a subframe 2, a subframe 3, a subframe 5, and a subframe 10 of 10 subframes (that is, the subframe 1 to the subframe 10) in the $3^{rd}$ second period. In this way, the base station does not need to send the first control signaling once every 10 subframes, but only needs to send the second control signaling once in three second periods, thereby reducing signaling overheads and improving resource utilization.

It should be noted that the fourth time domain resource may be continuous or non-continuous. For example, the fourth time domain resource may include a subframe 1 to a subframe 5, or may include a subframe 1, a subframe 3, a subframe 5, a subframe 7, and a subframe 9.

In this embodiment of the present invention, optionally, the second configuration information uses at least one of an NDI field, a TPC command field, a CS for DMRS and OCC field, or an MCS & RV field of a PDCCH format 0 format to indicate the second group identifier and/or the second indication information.

Further, the second configuration information further includes at least one of a carrier indication field, a format 0/1a indication field, a frequency hopping indication field, a resource indication and frequency hopping resource allocation field, an uplink index, or a CSI request field of the PDCCH format 0 format. These fields can retain their original functions.

For example, as shown in FIG. 1C, the contention resource group includes 10 terminal devices: a terminal device 1, a terminal device 2, . . . , a terminal device 10, and the contention resource group is divided into two terminal device groups: a terminal device group 1 and a terminal device group 2. The terminal device group 1 includes the terminal device 1, the terminal device 2, the terminal device 3, the terminal device 4, and the terminal device 5, and the terminal device group 2 includes the terminal device 6, the terminal device 7, the terminal device 8, the terminal device 9, and the terminal device 10. DMRSs of all terminal devices in the terminal device group 1 are different, and DMRSs of all terminal devices in the terminal device group 2 are also different. However, DMRSs of the terminal device 1 and the terminal device 9 are the same. The base station schedules the terminal device group 1 by using first control signaling and schedules the terminal device group 2 by using second control signaling. Although the DMRSs of the terminal device 1 and the terminal device 9 are the same, because the terminal device group 1 and the terminal device group 2 transmit data at different time points, interference between the terminals with the same DRMS can be avoided, to obtain good communication quality. This can increase a quantity of connected terminal devices while obtaining good communication quality.

In this embodiment of the present invention, optionally, when the first control signaling and the second control signaling are sent on a same time domain resource, the third time domain resource is the same as the fifth time domain resource, the third time domain resource is a time domain resource that can be used by the first terminal device group, and the third time domain resource includes the first time domain resource.

In a group scheduling-based uplink contention transmission solution, transmission efficiency is relevant to a matching degree between terminal devices in a same terminal device group. A higher matching degree between the terminal devices in the terminal device group indicates higher transmission efficiency of the terminal devices. Therefore, in this embodiment of the present invention, the base station may re-group terminal devices according to SRSs sent by the terminal devices, and classify terminal devices with a relatively high matching degree into one terminal device group. Therefore, in this embodiment of the present invention, the following operations are further included:

sending, by the base station, third control signaling to all terminal devices in the contention resource group, where the third control signaling is used to instruct all the terminal devices to send SRSs (Sounding Reference Signal, sounding reference signal); and receiving, by the base station, an SRS sent by each of all the terminal devices, calculating CSIs (Channel State Information, channel state information) of corresponding terminal devices according to the received SRSs, and re-grouping the terminal devices in the contention resource group according to the CSIs corresponding to all the terminal devices respectively.

For example, the contention resource group includes 10 terminal devices: a terminal device 1, a terminal device 2, . . . , and a terminal device 10, and the contention resource group is divided into two terminal device groups: a terminal device group 1 and a terminal device group 2. The terminal device group 1 includes the terminal device 1, the terminal device 2, the terminal device 3, the terminal device 4, and the terminal device 5, and the terminal device group 2 includes the terminal device 6, the terminal device 7, the terminal device 8, the terminal device 9, and the terminal device 10. The base station sends third control signaling. The third control signaling is used to instruct the 10 terminal devices to send SRSs. The terminal device 1 sends an SRS 1, the terminal device 2 sends an SRS 2, . . . , and the terminal device 10 sends an SRS 10. The base station calculates a CSI 1 according to the SRS1, the base station calculates a CSI 2 according to the SRS 2, the base station calculates a CSI 3 according to an SRS 3, . . . , and the base station calculates a CSI 10 according to the SRS 10. The base station determines, according to the CSI 1, the CSI 2, . . . , the CSI 10, that a matching degree between the terminal device 1, the terminal device 3, the terminal device 5, the terminal device 7, and the terminal device 9 is higher and that a matching degree between the rest terminal devices is high. In this way, the terminal devices are classified into two groups: a terminal device group 1 including the terminal device 1, the terminal device 3, the terminal device 5, the terminal device 7, and the terminal device 9, and a terminal device group 2 including the terminal device 2, the terminal device 4, the terminal device 6, the terminal device 8, and the terminal device 10.

To improve transmission efficiency and make a terminal device group having a higher data volume obtain more transmission opportunities and a terminal device group having a lower data volume obtain fewer transmission opportunities, in this embodiment of the present invention, the following operations are further included:

sending, by the base station, fourth control signaling to all terminal devices in the contention resource group, where the fourth control signaling is used to instruct all the terminal devices to send BSRs (Buffer Status Reporter, buffer status report); and receiving, by the base station, the BSRs sent by all the terminal devices, and re-grouping the terminal devices in the contention resource group according to the BSRs sent by all the terminal devices respectively.

Alternatively, to ensure load balancing between terminal device groups, in this embodiment of the present invention, the base station adjusts grouping of the terminal devices in a semi-static manner according to historical throughputs of the terminal devices, and classifies terminal devices having higher historical throughputs to a terminal device group having lower historical throughputs, so as to ensure load balancing between terminal device groups. Therefore, in this embodiment of the present invention, the following operation is further included:

re-grouping, by the base station, the terminal devices in the contention resource group according to historical load statistics.

In this embodiment of the present invention, in a system running process, if the base station needs to adjust grouping of the terminal devices, the base station may reconfigure, for the terminal devices by using RRC (Radio Resource Control, radio resource control) signaling, a contention resource group to which the terminal devices belong, a terminal device group in the contention resource group, a root sequence and a cyclic shift of a related DMRS, and the like.

In this embodiment of the present invention, the base station scrambles different control signaling by using different CB-RNTIs, to distinguish control signaling corresponding to different contention resource groups. CB-RNTIs are corresponding to contention resource groups in a one-to-one manner. Both the first control signaling and the second control signaling are scrambled by using the CB-RNTI corresponding to the contention resource group.

In this embodiment of the present invention, in an initial access phase of a terminal device, the base station allocates an initial contention resource group to the terminal device according to a service type of the terminal device. That is, the base station determines, according to the service type of the terminal device, a contention resource that can be used by the terminal device.

In this embodiment of the present invention, optionally, the base station may identify a terminal device based on a DMRS. To increase a success rate of terminal device identification, orthogonality between DMRSs of terminal devices that use a same time-frequency resource for transmission needs to be ensured. To avoid a multipath effect, a quantity of terminal devices included in one terminal device group is less than or equal to 8.

It should be noted that the second time domain resource may be a basic time domain unit, that is, a subframe, in an LTE system, or certainly may be in another form. Further details are not described herein.

In this solution, one contention resource group may be divided into a plurality of terminal device groups, and terminal devices with a same DMRS may exist in two different terminal device groups. Even when terminal devices with a same DMRS exist in two different terminal device groups, interference can still be avoided. Therefore, according to the embodiments of the present invention, a quantity of connected terminal devices in one contention resource group is increased while good communication quality is obtained.

Referring to FIG. 2, in an embodiment of the present invention, another flowchart of data transmission is as follows:

Step 200: A terminal device in a first terminal device group in a contention resource group receives first control signaling sent by a base station, where the first control signaling is used to schedule the first terminal device group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by the terminal device.

Step 210: The terminal device transmits data on all or some second time domain resources of the first time domain resource according to the first control signaling. In this embodiment of the present invention, the first control signaling is used to schedule a terminal device group. Therefore, the first control signaling further carries a first group identifier of the first terminal device group. Only in this way can a terminal device that receives the control signaling determine whether the control signaling is used to schedule a terminal device group to which the terminal device belongs.

For example, the contention resource group includes 10 terminal devices: a terminal device 1, a terminal device 2, . . . , and a terminal device 10, and the contention resource group is divided into two terminal device groups: a terminal device group 1and a terminal device group 2. The terminal device group 1includes the terminal device 1, the terminal device 2, the terminal device 3, the terminal device 4, and the terminal device 5, and the terminal device group 2includes the terminal device 6, the terminal device 7, the terminal device 8, the terminal device 9, and the terminal device 10. The first control signaling is used to schedule the terminal device group 1. Therefore, the first control signaling carries a first group identifier of the terminal device group 1. In this way, after receiving the first control signaling, each terminal in the terminal device group 1can determine, according to the first group identifier in the first control signaling, whether the terminal device group 1 is to be scheduled.

In this embodiment of the present invention, n bits in the control signaling may be used to indicate a group identifier. If n is 1, the contention resource group may include a maximum of two terminal device groups; if n is 2, the contention resource group may include a maximum of four terminal device groups; and the rest may be deduced by analogy. Considering an actual application requirement and utilization efficiency of a terminal device group indication bit field, optionally, a value range of n may be [1,3]. As shown in FIG. 1B, a value of n is 2, and an indicated terminal device group is a group identifier of the terminal device group 2.

In an LTE system, one piece of control signaling can be used to schedule only one uplink transmission of one terminal device group. However, in a big connection scenario, this scheduling manner has a disadvantage of excessively high resource overheads. Therefore, in this embodiment of the present invention, control signaling has a specific effective time. That is, within the effective time, a scheduled terminal device conforms to scheduling of the control signaling. Therefore, in this embodiment of the present invention, to improve resource utilization and reduce signaling overheads, first configuration information further includes first period information and first indication information that is used to indicate a third time domain resource, the first period information is a first period length of a time domain resource that allows scheduling as indicated by the first control signaling, the third time domain resource is a first period quantity of the time domain resource that allows scheduling as indicated by the first control signaling, and the third time domain resource includes the first time domain resource.

In this case, after the receiving, by the base station according to the first control signaling, data transmitted by the first terminal device group on all or some second time domain resources of the first time domain resource, the following operation is further included:

receiving, by the base station on a time domain resource in the third time domain resource except the first time domain resource and according to the first period information, the data transmitted by the first terminal device group.

This can improve resource utilization and reduce signaling overheads.

For example, the contention resource group includes 10 terminal devices: a terminal device 1, a terminal device 2, . . . , and a terminal device 10, and the contention resource group is divided into two terminal device groups: a terminal device group 1 and a terminal device group 2. The terminal device group 1 includes the terminal device 1, the terminal device 2, the terminal device 3, the terminal device 4, and the terminal device 5, and the terminal device group 2 includes the terminal device 6, the terminal device 7, the terminal device 8, the terminal device 9, and the terminal device 10. The first control signaling is used to schedule the terminal device group 1, the first period information includes 10 subframes, the first time domain resource includes a subframe 1, a subframe 2, a subframe 3, a subframe 5, and a subframe 10, and the third time domain resource includes three first periods, that is, 30 subframes. Each terminal device in the terminal device group 1 may transmit data in a subframe 1, a subframe 2, a subframe 3, a subframe 5, and a subframe 10 in the $1^{st}$ first period (that is, the subframe 1 to the subframe 10), then transmit data in a subframe 1, a subframe 2, a subframe 3, a subframe 5, and a subframe 10 of 10 subframes (that is, the subframe 1 to the subframe 10) in the $2^{nd}$ first period, and next, transmit data in a subframe 1, a subframe 2, a subframe 3, a subframe 5, and a subframe 10 of 10 subframes (that is, the subframe 1 to the subframe 10) in the $3^{rd}$ first period. In this way, the base station does not need to send the first control signaling once every 10 subframes, but only needs to send the first control signaling once in three first periods, thereby reducing signaling overheads and improving resource utilization.

It should be noted that the first time domain resource may be continuous or non-continuous. For example, the first time domain resource may include a subframe 1 to a subframe 5, or may include a subframe 1, a subframe 3, a subframe 5, a subframe 7, and a subframe 9.

For example, nine bits of the first control signaling are bits occupied by a time domain resource included in a first period. One bit is used to indicate whether one subframe can be used by the first terminal device group, and the nine bits in the first control signaling may indicate whether nine subframes in each first period can be used by the first terminal device group. That a bit is set indicates that a corresponding subframe can be used by the first terminal device group, and that a bit is reset indicates that a corresponding subframe cannot be used by the first terminal device group.

In the foregoing description of this embodiment, that the time domain resource included in the first period occupies nine bits may indicate whether nine subframes can be used by the first terminal device group. Certainly, in actual application, whether subframes of a quantity less than 9 can be used by the first terminal device group may alternatively be indicated. For example, that the time domain resource included in the first period occupies eight bits, seven bits, or six bits may indicate whether eight subframes, seven subframes, or six subframes can be used by the first terminal device group. Further details are not described herein.

In this embodiment of the present invention, the first configuration information uses at least one of an NDI field, a TPC command field, a CS for DMRS and OCC field, or an MCS & RV field of a PDCCH format 0 format to indicate the first group identifier and/or the first indication information.

Further, the first configuration information further includes at least one of a carrier indication field, a format 0/1a indication field, a frequency hopping indication field, a resource indication and frequency hopping resource allocation field, an uplink index, or a CSI request field of the PDCCH format 0 format. These fields can retain their original functions.

In a group scheduling-based uplink contention transmission solution, transmission efficiency is relevant to a matching degree between terminal devices in one terminal device group. A higher matching degree between the terminal devices in the terminal device group indicates higher transmission efficiency of the terminal devices. Therefore, in this embodiment of the present invention, the base station may re-group terminal devices according to SRSs sent by the terminal devices, and classify terminal devices with a relatively high matching degree into one terminal device group. Therefore, in this embodiment of the present invention, the following operation is further included:

receiving, by the terminal device, third control signaling sent by the base station, and sending an SRS to the base station according to the third control signaling.

To improve transmission efficiency and make a terminal device group having a higher data volume obtain more transmission opportunities and a terminal device group having a lower data volume obtain fewer transmission opportunities, in this embodiment of the present invention, the following operation is further included:

receiving, by the terminal device, fourth control signaling sent by the base station, and sending a BSR to the base station according to the fourth control signaling.

In this embodiment of the present invention, the base station scrambles different control signaling by using different CB-RNTIs, to distinguish control signaling corresponding to different contention resource groups. CB-RNTIs are corresponding to contention resource groups in a one-to-one manner. Therefore, the first control signaling is scrambled by using a contention-based radio network temporary identifier CB-RNTI corresponding to the contention resource group.

After the receiving, by a terminal device in a first terminal device group, first control signaling sent by a base station and before the transmitting data according to the first control signaling, the following operation is further included:

decoding, by the terminal device, the first control signaling by using the stored CB-RNTI, and succeeding in the decoding.

In this embodiment of the present invention, in an initial access phase of a terminal device, the base station allocates an initial contention resource group to the terminal device according to a service type of the terminal device. That is, the base station determines, according to the service type of the terminal device, a contention resource that can be used by the terminal device.

In this embodiment of the present invention, optionally, the base station may identify a terminal device based on a DMRS. To increase a success rate of terminal device identification, orthogonality between DMRSs of terminal devices that use a same time-frequency resource for transmission needs to be ensured. To avoid a multipath effect, a quantity of terminal devices included in one terminal device group is less than or equal to 8.

It should be noted that the second time domain resource may be a basic time domain unit, that is, a subframe, in an LTE system, or certainly may be in another form. Further details are not described herein.

Referring to FIG. 3A, an embodiment of the present invention provides a base station. The base station includes a sending unit 30 and a receiving unit 31.

The sending unit 30 is configured to send first control signaling, where the first control signaling is used to schedule a first terminal device group in a contention resource group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by a terminal device.

The receiving unit 31 is configured to receive, according to the first control signaling, data transmitted by the first terminal device group on all or some second time domain resources of the first time domain resource.

Optionally, the first control signaling carries a first group identifier of the first terminal device group; and The sending unit 30 is further configured to send first configuration information to each terminal device in the first terminal device group, where the first configuration information includes the first group identifier.

Optionally, the first configuration information further includes first period information and first indication information that is used to indicate a third time domain resource, the first period information is a first period length of a time domain resource that allows scheduling as indicated by the first control signaling, the third time domain resource is a first period quantity of the time domain resource that allows scheduling as indicated by the first control signaling, and the third time domain resource includes the first time domain resource.

Further, the receiving unit 31 is further configured to receive, on a time domain resource in the third time domain resource except the first time domain resource and according to the first period information, the data transmitted by the first terminal device group.

Optionally, the first configuration information uses at least one of a new data indication NDI field, a transmission power control TPC command command field, a cyclic shift CS for demodulation reference signal DMRS and orthogonal cover code OCC field, or a modulation and coding scheme MCS & redundancy version RV field of a physical downlink control channel PDCCH format 0 format to indicate the first group identifier and/or the first indication information.

Further, the first configuration information further includes at least one of a carrier indication, a format 0/1a indication, a frequency hopping indication, a resource indication and frequency hopping resource allocation, an uplink index, or a CSI request of the PDCCH format 0 format.

Further, the sending unit 30 is further configured to send second control signaling, where the second control signaling is used to schedule a second terminal device group in the contention resource group to transmit data on a fourth time domain resource, the first time domain resource is different from the fourth time domain resource, and the fourth time domain resource includes at least one second time domain resource; and The receiving unit 31 is further configured to receive, according to the second control signaling, data transmitted by the second terminal device group on all or some second time domain resources of the fourth time domain resource.

Optionally, the second control signaling carries a second group identifier of the second terminal device group; and The sending unit 30 is further configured to send second configuration information to each terminal device in the second terminal device group, where the second configuration information includes the second group identifier.

Further, the second configuration information further includes second period information and second indication information that is used to indicate a fifth time domain resource, the second period information is a second period length of a time domain resource that allows scheduling as indicated by the second control signaling, the fifth time domain resource is a second period quantity of the time domain resource that allows scheduling as indicated by the second control signaling, and the fifth time domain resource includes the fourth time domain resource.

Further, the receiving unit 31 is further configured to receive, on a time domain resource in the fifth time domain resource except the fourth time domain resource and according to the second period information, the data transmitted by the second terminal device group.

Optionally, the second configuration information uses at least one of an NDI field, a TPC command field, a CS for DMRS and OCC field, or an MCS & RV field of a PDCCH format 0 format to indicate the second group identifier and/or the second indication information.

Further, the second configuration information further includes at least one of a carrier indication, a format 0/1a indication, a frequency hopping indication, a resource indication and frequency hopping resource allocation, an uplink index, or a CSI request of the PDCCH format 0 format.

Optionally, when the first control signaling and the second control signaling are sent on a same time domain resource, the third time domain resource is the same as the fifth time domain resource; the third time domain resource is a time domain resource that can be used by the first terminal device group; and the third time domain resource includes the first time domain resource.

Further, the sending unit 30 is further configured to send third control signaling to all terminal devices in the contention resource group, where the third control signaling is used to instruct all the terminal devices to send sounding reference signals SRSs;

the receiving unit 31 is further configured to receive an SRS sent by each of all the terminal devices; and the base station further includes a processing unit 32, configured to: calculate channel state information CSIs of corresponding terminal devices according to the received SRSs, and re-group terminal devices in the contention resource group according to the CSIs corresponding to all the terminal devices respectively.

Further, the sending unit 30 is further configured to send fourth control signaling to all the terminal devices in the contention resource group, where the fourth control signaling is used to instruct all the terminal devices to send buffer status reports BSRs;

the receiving unit 31 is further configured to receive the BSRs sent by all the terminal devices; and the base station further includes a processing unit 32, configured to re-group the terminal devices in the contention resource group according to the BSRs sent by all the terminal devices respectively.

Further, the base station further includes a processing unit 32, configured to re-group the terminal devices in the contention resource group according to historical load statistics.

Optionally, both the first control signaling and the second control signaling are scrambled by using a contention-based radio network temporary identifier CB-RNTI corresponding to the contention resource group.

Figure 3B:
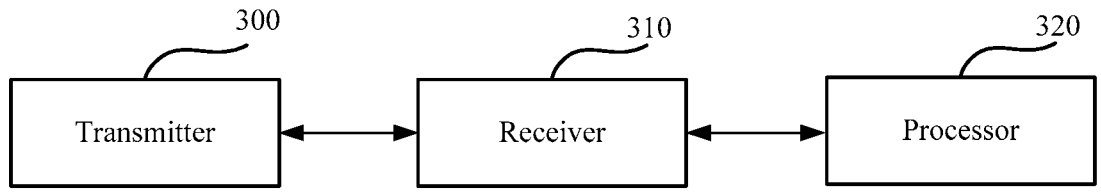
FIG. 3B is another schematic diagram of a base station according to an embodiment of the present invention.

Referring to FIG. 3B, an embodiment of the present invention provides a base station. The base station includes a transmitter 300 and a receiver 310.

The transmitter 300 is configured to send first control signaling, where the first control signaling is used to schedule a first terminal device group in a contention resource group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by a terminal device.

The receiver 310 is configured to receive, according to the first control signaling, data transmitted by the first terminal device group on all or some second time domain resources of the first time domain resource.

It should be noted that, the transmitter 300 may further perform other operations performed by the sending unit 30 in FIG. 3A, the receiver 310 may further perform other operations performed by the receiving unit 31 in FIG. 3A, and the base station further includes a processor 320, configured to perform the operations performed by the processing unit 32 in FIG. 3A.

Figure 4A:
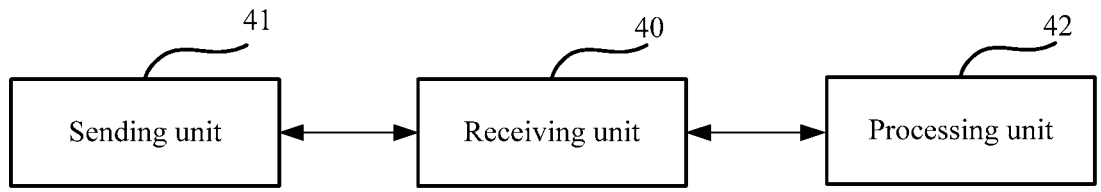
FIG. 4A is a schematic diagram of a terminal device according to an embodiment of the present invention.

Referring to FIG. 4A, an embodiment of the present invention provides a terminal device. The terminal device includes a receiving unit 40 and a sending unit 41.

The receiving unit 40 is configured to receive first control signaling sent by a base station, where the first control signaling is used to schedule the first terminal device group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by the terminal device.

The sending unit 41 is configured to transmit data on all or some second time domain resources of the first time domain resource according to the first control signaling.

Optionally, the first control signaling carries a first group identifier of the first terminal device group;

the receiving unit 40 is further configured to receive first configuration information sent by the base station; and the terminal device further includes a processing unit 42, configured to determine, according to the first configuration information, that a group identifier of the first terminal device group is the first group identifier, where the first configuration information includes the first group identifier.

Further, the terminal device further includes the processing unit 42, configured to determine that the first group identifier is a group identifier of a terminal device group to which the terminal device belongs.

Further, the first configuration information further includes first period information and first indication information that is used to indicate a third time domain resource, the first period information is a first period length of a time domain resource that allows scheduling as indicated by the first control signaling, the third time domain resource is a first period quantity of the time domain resource that allows scheduling as indicated by the first control signaling, and the third time domain resource includes the first time domain resource.

Further, the sending unit 41 is further configured to send data on a time domain resource in the third time domain resource except the first time domain resource and according to the first period information.

Optionally, the first configuration information uses at least one of a new data indication NDI field, a transmission power control TPC command command field, a cyclic shift CS for demodulation reference signal DMRS and orthogonal cover code OCC field, or a modulation and coding scheme MCS & redundancy version RV field of a physical downlink control channel PDCCH format 0 format to indicate the first group identifier and/or the first indication information.

Further, the first configuration information further includes at least one of a carrier indication, a format 0/1a indication, a frequency hopping indication, a resource indication and frequency hopping resource allocation, an uplink index, or a CSI request of the PDCCH format 0 format.

Further, the receiving unit 40 is further configured to receive third control signaling sent by the base station; and the sending unit 41 is further configured to send a sounding reference signal SRS to the base station according to the third control signaling.

Further, the receiving unit 40 is further configured to receive fourth control signaling sent by the base station; and the sending unit 41 is further configured to send a buffer status report BSR to the base station according to the fourth control signaling.

Optionally, the first control signaling is scrambled by using a contention-based radio network temporary identifier CB-RNTI corresponding to the contention resource group; and the terminal device further includes the processing unit 42, configured to: decode the first control signaling by using the stored CB-RNTI, and succeed in the decoding.

Figure 4B:
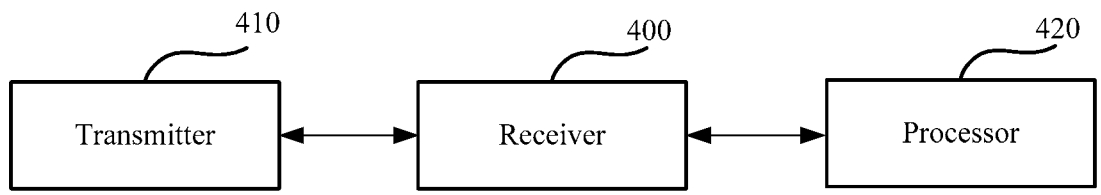
FIG. 4B is another schematic diagram of a terminal device according to an embodiment of the present invention.

Referring to FIG. 4B, an embodiment of the present invention provides a terminal device. The terminal device includes a receiver 400 and a transmitter 410.

The receiver 400 is configured to receive first control signaling sent by a base station, where the first control signaling is used to schedule the first terminal device group to transmit data on a first time domain resource, demodulation reference signals DMRSs of any two different terminal devices in any terminal device group in the contention resource group are different, the first time domain resource includes at least one second time domain resource, and the second time domain resource is a time domain unit used when the base station receives data transmitted by the terminal device.

The transmitter 410 is configured to transmit data on all or some second time domain resources of the first time domain resource according to the first control signaling.

It should be noted that, the receiver 400 may further perform other operations performed by the receiving unit 40 in FIG. 4A, the transmitter 410 may further perform other operations performed by the sending unit 41 in FIG. 4A, and the terminal device further includes a processor 420, configured to perform the operations performed by the processing unit 42 in FIG. 4A.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A data transmission method, comprising:
    sending, by a base station, first configuration information to each terminal device in a first terminal device group in a contention resource group, wherein the first configuration information comprises first period information and first indication information;
    sending, by the base station, first control signaling, wherein the first control signaling is used to schedule the first terminal device group in the contention resource group to transmit data on a first time domain resource,
        wherein demodulation reference signals (DMRSs) of any two different terminal devices in any terminal device group in the contention resource group are different,
        wherein the first time domain resource comprises at least one second time domain resource,
        wherein the second time domain resource is a time domain unit used when the base station receives data transmitted by a terminal device,
        wherein the first indication information is used to indicate a third time domain resource, wherein the first period information is a first period length of a time domain resource that allows scheduling as indicated by the first control signaling,
        wherein the third time domain resource is a first period quantity of the time domain resource that allows scheduling as indicated by the first control signaling, and
        wherein the third time domain resource comprises the first time domain resource; and
    receiving, by the base station according to the first control signaling, data transmitted by the first terminal device group on at least some of the second time domain resources of the first time domain resource.

2. The method according to claim 1, wherein the first control signaling carries a first group identifier of the first terminal device group; and wherein the first configuration information comprises the first group identifier.

3. The method according to claim 2, wherein the first configuration information uses at least one of a new data indication (NDI) field, a transmission power control (TPC) command field, a cyclic shift (CS) for demodulation reference signal (DMRS) and orthogonal cover code (OCC) field, or a modulation and coding scheme (MCS) & redundancy version (RV) field of a physical downlink control channel (PDCCH) format 0 format to indicate at least one of the first group identifier or the first indication information.

4. The method according to claim 3, wherein the first configuration information further comprises at least one of a carrier indication, a format 0/1a indication, a frequency hopping indication, a resource indication and frequency hopping resource allocation, an uplink index, or a channel state information (CSI) request of the PDCCH format 0.

5. The method according to claim 1, wherein after the receiving, by the base station according to the first control signaling, data transmitted by the first terminal device group on at least some of the second time domain resources of the first time domain resource, the method further comprises:
   receiving, by the base station on a time domain resource in the third time domain resource except the first time domain resource and according to the first period information, the data transmitted by the first terminal device group.

6. A data transmission method, comprising:
   receiving, by a terminal device, first configuration information sent by a base station, wherein the first configuration information comprises first period information and first indication information;
   receiving, by the terminal device in a first terminal device group in a contention resource group, first control signaling sent by the base station,
      wherein the first control signaling is used to schedule the first terminal device group to transmit data on a first time domain resource,
      wherein demodulation reference signals (DMRSs) of any two different terminal devices in any terminal device group in the contention resource group are different,
      wherein the first time domain resource comprises at least one second time domain resource,
      wherein the second time domain resource is a time domain unit used when the base station receives data transmitted by the terminal device,
      wherein the first indication information is used to indicate a third time domain resource,
      wherein the first period information is a first period length of a time domain resource that allows scheduling as indicated by the first control signaling,
      wherein the third time domain resource is a first period quantity of the time domain resource that allows scheduling as indicated by the first control signaling, and
      wherein the third time domain resource comprises the first time domain resource; and
   transmitting, by the terminal device, data on at least some of the second time domain resources of the first time domain resource according to the first control signaling.

7. The method according to claim 6, wherein the first control signaling carries a first group identifier of the first terminal device group; and
   determining, according to the first configuration information, that a group identifier of the first terminal device group is the first group identifier, wherein the first configuration information comprises the first group identifier.

8. The method according to claim 7, wherein before the transmitting, by the terminal device, data on at least some of the second time domain resources of the first time domain resource, the method further comprises:
   determining, by the terminal device, that the first group identifier is a group identifier of the terminal device group to which the terminal device belongs.

9. The method according to claim 7, wherein the first configuration information uses at least one of a new data indication (NDI) field, a transmission power control (TPC) command field, a cyclic shift (CS) for demodulation reference signal (DMRS) and orthogonal cover code (OCC) field, or a modulation and coding scheme (MCS) & redundancy version (RV) field of a physical downlink control channel (PDCCH) format 0 format to indicate at least one of the first group identifier or the first indication information.

10. The method according to claim 9, wherein the first configuration information further comprises at least one of a carrier indication, a format 0/1a indication, a frequency hopping indication, a resource indication and frequency hopping resource allocation, an uplink index, or a CSI request of the PDCCH format 0 format.

11. The method according to claim 6, wherein after the transmitting, by the terminal device, data on at least some of the second time domain resources of the first time domain resource according to the first control signaling, the method further comprises:
   sending, by the terminal device according to the first period information, data on a time domain resource in the third time domain resource except the first time domain resource.

12. The method according to claim 6, wherein the method further comprises:
   receiving, by the terminal device, third control signaling sent by the base station; and
   sending a sounding reference signal (SRS) to the base station according to the third control signaling.

13. A base station, comprising:
   a transmitter, the transmitter configured to:
      send first configuration information to each terminal device in a first terminal device group in a contention resource group, wherein the first configuration information comprises first period information and first indication information;
      send first control signaling,
      wherein the first control signaling is used to schedule the first terminal device group in the contention resource group to transmit data on a first time domain resource,
      wherein demodulation reference signals (DMRSs) of any two different terminal devices in any terminal device group in the contention resource group are different,
      wherein the first time domain resource comprises at least one second time domain resource,
      wherein the second time domain resource is a time domain unit used when the base station receives data transmitted by a terminal device,
      wherein the first indication information is used to indicate a third time domain resource,
      wherein the first period information is a first period length of a time domain resource that allows scheduling as indicated by the first control signaling, wherein the third time domain resource is a first period quantity of the time domain resource that allows scheduling as indicated by the first control signaling, and wherein the third time domain resource comprises the first time domain resource; and a receiver, the receiver configured to receive, according to the first control signaling, data transmitted by the first terminal device group on at least some of the second time domain resources of the first time domain resource.

14. The base station according to claim 13, wherein the first control signaling carries a first group identifier of the first terminal device group; and wherein the first configuration information comprises the first group identifier.

15. The base station according to claim 14, wherein the first configuration information uses at least one of a new data indication (NDI) field, a transmission power control TPC (command) field, a cyclic shift (CS) for demodulation reference signal (DMRS) and orthogonal cover code (OCC) field, or a modulation and coding scheme (MCS) & redundancy version (RV) field of a physical downlink control channel (PDCCH) format 0 format to indicate at least one of the first group identifier or the first indication information.

16. The base station according to claim 15, wherein the first configuration information further comprises at least one of a carrier indication, a format 0/1a indication, a frequency hopping indication, a resource indication and frequency hopping resource allocation, an uplink index, or a channel state information (CSI) request of the PDCCH format 0 format.

17. The base station according to claim 13, wherein the receiver is further configured to receive, on a time domain resource in the third time domain resource except the first time domain resource and according to the first period information, the data transmitted by the first terminal device group.

* * * * *